(12) United States Patent
Bekker

(10) Patent No.: US 11,980,853 B2
(45) Date of Patent: May 14, 2024

(54) WINE AERATION DEVICES AND METHODS OF AERATING WINE

(71) Applicant: Gennady Bekker, San Jose, CA (US)

(72) Inventor: Gennady Bekker, San Jose, CA (US)

( * ) Notice: Subject to any disclaimer, the term of this patent is extended or adjusted under 35 U.S.C. 154(b) by 0 days.

(21) Appl. No.: 18/059,843

(22) Filed: Nov. 29, 2022

(65) Prior Publication Data

US 2023/0166223 A1 Jun. 1, 2023

Related U.S. Application Data

(60) Provisional application No. 63/264,770, filed on Dec. 1, 2021.

(51) Int. Cl.

| | | |
|---|---|---|
| *B01F 25/312* | (2022.01) | |
| *B01F 23/2361* | (2022.01) | |
| *B01F 23/237* | (2022.01) | |
| *B01F 25/10* | (2022.01) | |
| *B01F 35/21* | (2022.01) | |
| *B01F 35/22* | (2022.01) | |
| *B01F 35/71* | (2022.01) | |
| *C12H 1/14* | (2006.01) | |
| *B01F 101/17* | (2022.01) | |

(52) U.S. Cl.
CPC ...... *B01F 25/3121* (2022.01); *B01F 23/2361* (2022.01); *B01F 23/237611* (2022.01); *B01F 25/103* (2022.01); *B01F 35/2132* (2022.01); *B01F 35/2202* (2022.01); *B01F 35/7176* (2022.01); *C12H 1/14* (2013.01); *B01F 2101/17* (2022.01)

(58) Field of Classification Search
CPC .............. B01F 25/3121; B01F 23/2361; B01F 23/237611; B01F 25/103; B01F 35/2132; B01F 35/2202; B01F 35/7176; B01F 2101/17; B01F 23/2323; B01F 23/234; B01F 25/31242; B01F 25/53; C12H 1/14; C12G 1/00

See application file for complete search history.

(56) References Cited

U.S. PATENT DOCUMENTS

| | | | | |
|---|---|---|---|---|
| 1,762,126 A | * | 6/1930 | Smith | ................ B67D 1/0857 |
| | | | | 40/406 |
| 1,780,687 A | * | 11/1930 | Smith | ................ B67D 1/0055 |
| | | | | 222/113 |

(Continued)

FOREIGN PATENT DOCUMENTS

| | | | | | |
|---|---|---|---|---|---|
| WO | WO-2007130887 A2 | * | 11/2007 | ............ | B01F 3/0473 |
| WO | WO-2011118086 A1 | * | 9/2011 | ............ | A47G 23/00 |
| WO | WO-2014101720 A1 | * | 7/2014 | .......... | B01F 15/0261 |

OTHER PUBLICATIONS

"The first Smart Wine Aerator", AVEiNE, Nov. 1, 2020, Retrieved from the Internet https://www.aveine.com/en.

(Continued)

*Primary Examiner* — Stephen Hobson

(57) ABSTRACT

A wine aeration device and methods of aerating wine that draw wine from the bottom ⅓ of the container into an aeration chamber where the wine undergoes a first phase of aeration. The wine continues through a return tube into the container where it undergoes a second phase of aeration by way of multiple slits in the return tube causing a venturi effect on the flowing wine.

16 Claims, 5 Drawing Sheets

(56) References Cited

U.S. PATENT DOCUMENTS

| | | | | |
|---|---|---|---|---|
| 2,680,010 | A * | 6/1954 | Dubay | B05B 7/0037 |
| | | | | 261/124 |
| 3,356,218 | A * | 12/1967 | Grudoski | B01D 33/11 |
| | | | | 210/DIG. 8 |
| 3,691,787 | A * | 9/1972 | Kaufmann | B67D 1/0857 |
| | | | | D15/7 |
| 5,887,511 | A * | 3/1999 | Cappellotto | A47J 43/12 |
| | | | | 99/275 |
| 6,367,713 | B1 * | 4/2002 | Robinson | B05B 17/085 |
| | | | | 239/22 |
| 6,508,163 | B1 * | 1/2003 | Weatherill | B01F 35/712 |
| | | | | 99/275 |
| 7,121,534 | B2 * | 10/2006 | Dyson | B01F 23/234 |
| | | | | 261/120 |
| 7,299,743 | B2 * | 11/2007 | Moore | B01F 25/45 |
| | | | | 141/331 |
| 7,331,186 | B2 * | 2/2008 | Arav | B01L 7/50 |
| | | | | 62/62 |
| 8,757,048 | B2 * | 6/2014 | Burroughs | B01F 23/234 |
| | | | | 99/323.1 |
| 10,160,630 | B1 * | 12/2018 | Chung | A47G 23/00 |
| 10,239,029 | B2 * | 3/2019 | Khayman | B01F 35/2209 |
| D850,195 | S * | 6/2019 | Ding | D7/397 |
| 11,000,813 | B2 * | 5/2021 | Giardullo | B01F 23/23411 |
| 2004/0149137 | A1 * | 8/2004 | Francia | C12G 1/0216 |
| | | | | 99/276 |
| 2007/0256568 | A1 * | 11/2007 | Nudi | B01F 25/4321 |
| | | | | 99/275 |
| 2010/0025867 | A1 * | 2/2010 | Benton | B01F 23/234 |
| | | | | 261/110 |
| 2010/0058933 | A1 * | 3/2010 | Cheng | B01F 27/84 |
| | | | | 99/323.1 |
| 2012/0201942 | A1 * | 8/2012 | Kilduff | B01F 33/5012 |
| | | | | 261/6 |
| 2014/0065266 | A1 * | 3/2014 | Shalev | A23L 2/54 |
| | | | | 261/138 |
| 2016/0214071 | A1 * | 7/2016 | Stevenson | B01F 23/2361 |
| 2016/0339398 | A1 * | 11/2016 | Stevenson | B01F 23/23611 |
| 2016/0354733 | A1 * | 12/2016 | Chung | B01F 23/236 |
| 2018/0250643 | A1 * | 9/2018 | Benati | B01F 23/23411 |
| 2018/0304209 | A1 * | 10/2018 | Hellmers | A47G 23/0241 |
| 2019/0151808 | A1 * | 5/2019 | Giardullo | B01F 23/2361 |
| 2020/0269198 | A1 * | 8/2020 | Stevenson | B01F 23/23123 |

OTHER PUBLICATIONS

"Vinaera Pro Adjustable Electric Wine Aerator", VinaeraGlobal, Youtube, Oct. 6, 2018, Retrieved from: https://www.youtube.com/watch?v=H-IHkTTLLSl.

\* cited by examiner

WINE AERATION DEVICES AND METHODS OF AERATING WINE

CROSS-REFERENCE TO RELATED APPLICATIONS

The present application claims priority to U.S. Provisional Application No. 63/264,770, filed Dec. 1, 2021, the disclosure of which is incorporated herein by reference.

FIELD OF THE INVENTION

The present invention relates to wine aeration devices and methods. More specifically, self-contained devices and methods designed to provide aeration to the contents of a wine bottle.

BACKGROUND OF THE INVENTION

Wine aeration or decanting is a method of exposing the wine, that has been aged in a bottle, to the air. There are various reasons as to why wine would be decanted or aerated. First, the process helps to filter or separate the liquid wine from the solid material that typically forms during the aging process. Second, the exposure of the wine to air or oxygenated air can help to release the various gases that also develop over the aging process. This helps to improve the flavor of the wine for improved consumption.

Traditional methods of decanting wine are typically put into two main categories—slow progressive, and accelerated. The slow progressive method of decanting can consist of increasing the surface area of wine that is exposed to the oxygen. This is typically done by opening the wine for a period of time and allowing it to be exposed to air. Subsequently, the wind can be poured into a separate bottle with a large expanded base. The expanded base opens the wine and exposes more of the wine to the air. Additionally, the wine can be transferred between several bottles allowing it to be further exposed to air. This process can take hours to complete and can vary depending on the type of wine.

The accelerated method, as implied by the name, is a faster method of decanting or aeration. Accelerating is typically done as the wine is poured directly from the bottle. The process typically involves some external device that the wine is poured through. The poured wine uses a single pass of the wine through the aerator as it is poured into the glass. This method typically exposes the wine to a fixed amount of air or oxygen. Accordingly, this may produce different results depending on the wine.

Such traditional methods tend to be time consuming and/or fail to consider the varieties of flavors that can be present in the variety of wines available. This can lead to increased prep time and inadequate flavor.

SUMMARY OF THE INVENTION

Embodiments of the disclosures are directed to self-contained devices designed to provide aeration to the contents of a wine bottle Various embodiments of the disclosure are directed to wine aeration devices including:
  a pump with an inlet valve and an exit valve connected to a power source;
  a first fluid tube with an elongated body having a proximal end and a distal end where the distal end is positioned within the bottom 1/3 of a container of wine and wherein the proximal end is in fluid communication with the inlet valve of the pump;
  a second fluid tube in fluid communication with the exit valve and positioned to dispense wine from the bottle into an upper portion of an aeration chamber initiating a first phase of wine aeration;
  a third fluid tube in fluid communication with a bottom portion of the aeration chamber and configured to receive wine from the aeration chamber and direct the wine back into the container, and wherein the third fluid tube has at least a first set of incisions that transect the third fluid tube thereby creating a venturi effect in the wine thereby creating a second phase of wine aeration.

In still various embodiments of the disclosure a mesh filter is disposed on the distal end of the first fluid tube.

In yet various embodiments of the disclosure the first and third fluid tubes are metal.

In still yet various embodiments of the disclosure the aeration chamber is a funnel.

In yet still various embodiments of the disclosure a power source is electronically connected to the pump to activate the pump and initiate a wine aeration process.

In still yet various embodiments of the disclosure a second set of incisions transect the third fluid tube lower than the first set of incisions.

In yet still various embodiments of the disclosure an oxygen sensor is disposed in the second set of incisions and in fluid communication with the wine and configured to measure the amount of oxygen in the aerated wine.

In still yet various embodiments of the disclosure a computer processor is electronically connected to the pump and the oxygen sensor such that the computer processor is programmed to activate and deactivate the pump based on the measure of oxygen provided from the oxygen sensor.

In yet still various embodiments of the disclosure a housing is provided, wherein the housing has a body with an outer wall and an inner wall defining a space therebetween, and wherein at least the pump is disposed therein.

In still yet various embodiments of the disclosure the aeration chamber is disposed within the housing.

In yet still various embodiments of the disclosure the aeration chamber is disposed beneath the housing and the first fluid tube extends through the center of the aeration chamber and the third fluid tube.

In still yet various embodiments of the disclosure a metallic rod extends through the first set of incisions.

Many embodiments of the disclosure are directed to methods of aerating wine including:
  drawing wine from the bottom 1/3 of a container;
  introducing the wine into an aeration chamber in a spiral flow initiating a first phase of wine aeration;
  passing the wine through an incision in a return tube to create a venturi effect in the wine thereby creating a second phase of wine aeration; and
  reintroducing the wine into the container.

In still many embodiments the method includes straining the wine for sedimentation prior to introducing the wine into the aeration chamber.

In yet many embodiments the method includes monitoring the oxygenation of the wine prior to reintroducing the wine into the container.

In still yet many embodiments the method includes repeating the aeration process to induce a desired oxygenation level in the aerate wine.

Additional embodiments and features are set forth in part in the description that follows, and in part will become apparent to those skilled in the art upon examination of the specification or may be learned by the practice of the disclosure. A further understanding of the nature and advantages of the present disclosure may be realized by reference to the remaining portions of the specification and the drawings, which forms a part of this disclosure.

BRIEF DESCRIPTION OF THE DRAWINGS

These and other features and advantages of the present invention will be better understood by reference to the following detailed description when considered in conjunction with the accompanying data and figures, wherein.

DETAILED DISCLOSURE

Figure 1:
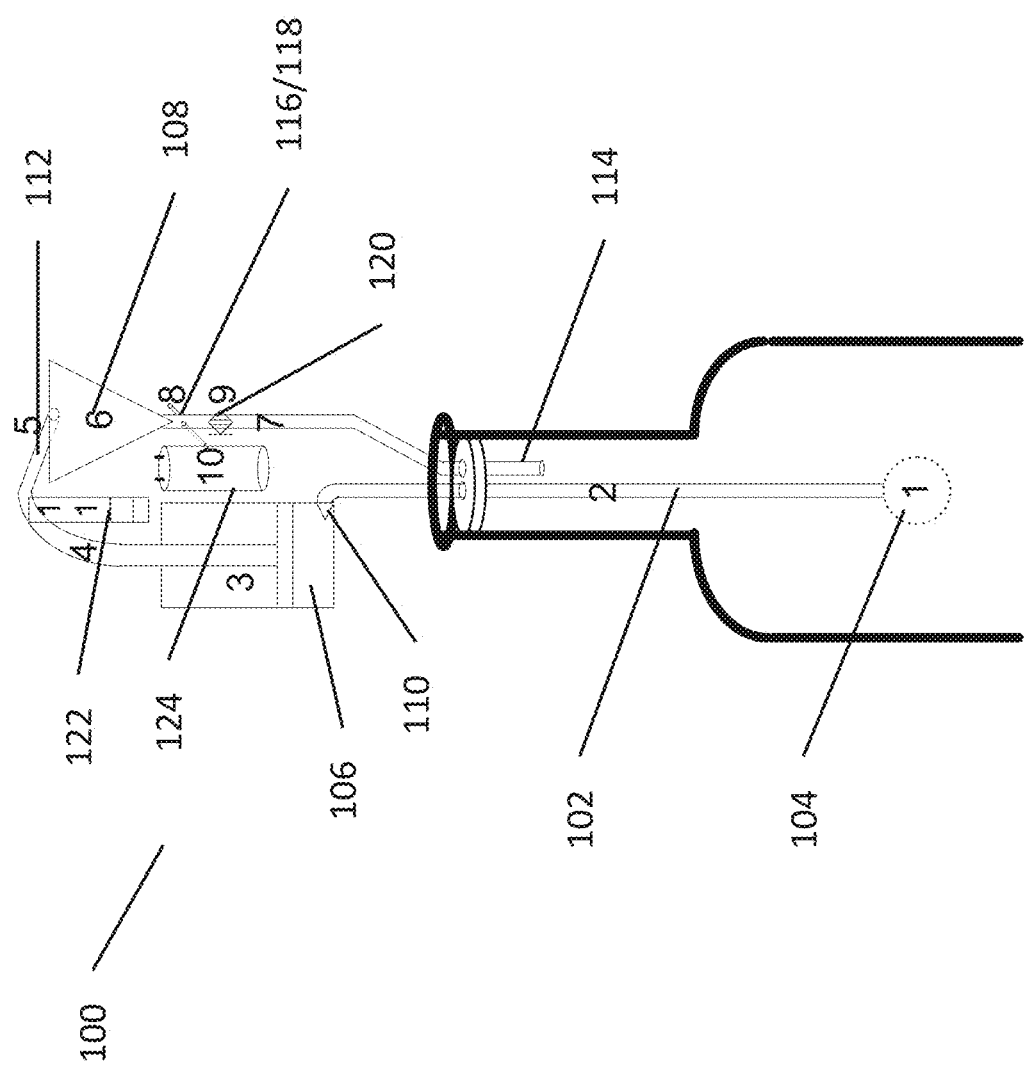
FIG. 1 provides a schematic of a wine aeration device in accordance with embodiments of the invention.

It will be readily understood that the components of the embodiments as generally described herein and illustrated in the appended figures may be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive.

Reference throughout this specification to features, advantages, or similar language does not imply that all of the features and advantages that may be realized by the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment. Thus, the phrases "in one embodiment", "in an embodiment", and similar language throughout this specification may, but do not necessarily, all refer to the same embodiment.

Wine decanters and/or wine aeration devices are traditionally a larger bottle or container with a larger base by which wine can be poured into. This creates a larger surface area for wine to be exposed to air to help bring out the flavor in the particular wine. This process can involve additional steps of transferring the wine between bottles to help filter out the sediments as well as expose it to air over time. Other methods have been used to help reduce the time it takes to aerate the wine by passing wine through a single pass aeration device as it poured into a glass for consumption. However, such methods can be limiting in the ability to fully flavor the wine by only producing a single pass through device.

In contrast, many embodiments described herein are directed to an accelerated progressive method of aerating wine. Various embodiments include a pump to circulate wine in the bottle and progressively improve the oxygen level of the wine. The pump can move the wine up through a filter and then accelerate the wine through an aerator while processing the wine back into the bottle. In numerous embodiments, the wine is initially pumped from the bottom ⅓ of the bottle. This ensures that wine is continually circulated from the least aerated portion of the bottle. In various embodiments, the wine can be circulated over and over until the wine has reached its full flavor. As can be appreciated, this can vary depending on the wine.

Referring now to the figures, embodiments of a wine aeration device are illustrated. FIG. 1, for example, conceptually illustrates a drawing of a wine aeration device for aerating wine before pouring it and its various components. In many embodiments the wine aeration device 100 is configured to pump wine from the lower ⅓ of the bottle and through a pipe 102 that extends into the lower ⅓ of the bottle. In some embodiments, the pipe has a filter 104 on the end to prevent any sediment that may exist from entering the aeration device and causing issues like clogging. In various embodiments, the filter can be made from any number of materials such as metal such that it does not contaminate or cause issues with the wine in the bottle.

In accordance with many embodiments, the aeration device 100 is equipped with a pump element 106 that is configured to pump wine from the lower ⅓ of the bottle into an aeration chamber 108. The aeration chamber 108 can have a funnel like shape in numerous embodiments. The first lower pipe 102 can be connected to the pump through an inlet valve 110 and the wine can flow out of the pump through a second pipe 112 which is positioned to direct wine into the aeration chamber 108 along the inner surface and parallel to the upper edge of the aeration chamber 108. The positioning of the second pipe with respect to the funnel can force create a spiral type motion within the aeration chamber 108. The spiral motion of the wind in the funnel 108 performs a first phase of aeration by moving the wine through the funnel and exposing it to air in a manner that allows it to reach an optimum flavor.

Numerous embodiments of the aerator 100 will have a return pipe 114 connected to the bottom portion of the funnel 108 that can direct the flow of the wine back into the bottle or container. In many embodiments, the return pipe 114 may have a small incision 116 near the connection with the funnel 108 where a small diameter pipe 118 is inserted and transects the return pipe 114. The use of the transecting pipe 118 can create a venturi effect in the flow of the wine as it leaves the funnel 108. The venturi effect thus produces a second phase of aeration by introducing additional air or oxygen in to the wine. Additionally, the production of the venturi effect, through the transecting pipe 118 helps regulate the pressure within the aerator 100 during operation.

As can be appreciated, many embodiments of an aerator can be configured with a number of additional features or elements that can help to improve the performance of the device. For example, FIG. 1 further illustrates a small incision made into the return pipe 114 where an oxygen sensor 120 can be inserted. The oxygen sensor can be used to help determine the proper or desired level of aeration for the particular wine. Many embodiments may also have an onboard computer or processors 122 that is connected to the oxygen sensor. The computer 122 can also be connected to a display screen such that the level of oxygenation is readily displayed for the end user. Other embodiments may be equipped with additional features such as remote connectivity and control, like Bluetooth or WIFI. Accordingly, many embodiments may have an onboard battery or power supply 124 that is connected to the various components such as the pump, the sensor, and/or the computer. In accordance with some embodiments, the battery may be removable, rechargeable, or both. Other embodiments may be configured with a charging port or connection (not shown) that allows the aerator to be directly connected to a power source. Although, a particular configuration is illustrated, it should be appreciated that the configuration of the various elements can vary and can be arranged in such a way that allows for improved production and/or use.

Figure 2:
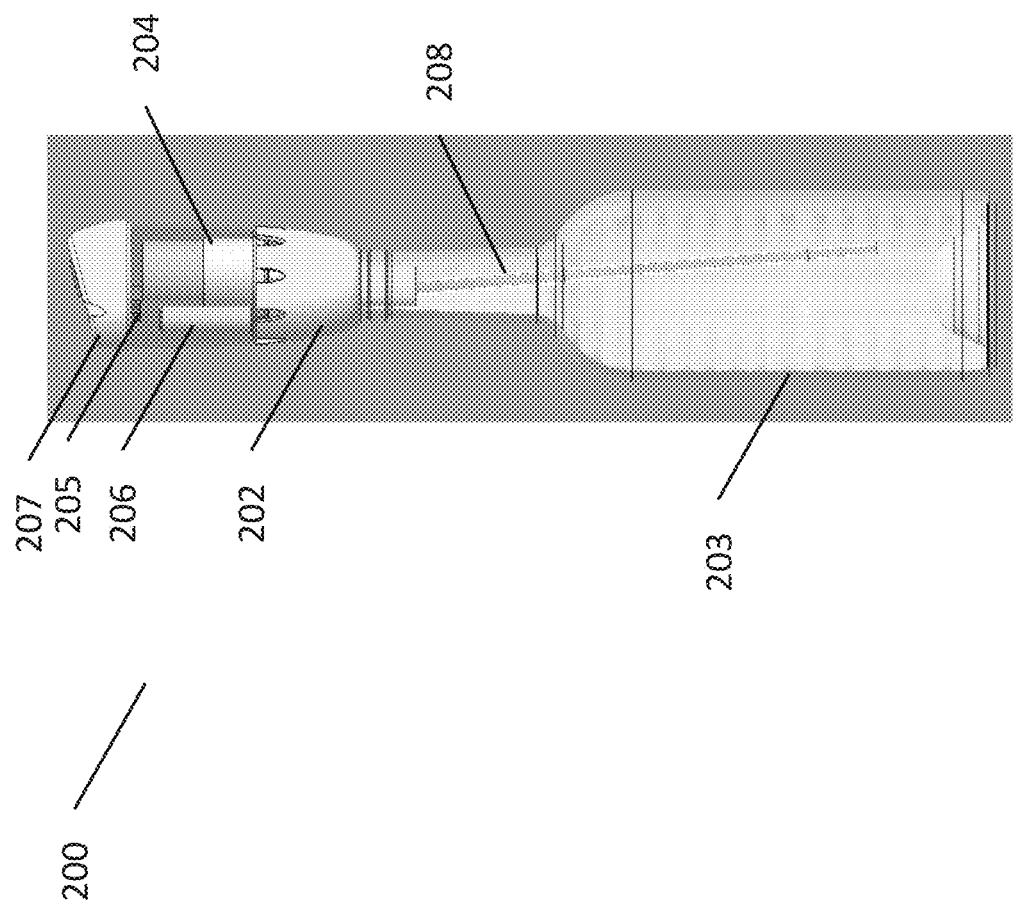
FIG. 2 provides a see-through schematic of a wine aeration device in accordance with embodiments of the invention.

As an example, FIG. 2 provides a schematic of an embodiment of an enclosed wine aeration device 200. In accordance with many embodiments, the aeration device 200 can be configured with an aeration chamber 202 to be directly connected to the top of the container of wine 203. The other components, such as the pump 204, computer 205, and battery 206 can be disposed in a housing 207 positioned on top of the aeration chamber 202. The aerator can have a first pump pipe 208 that is centrally located and runs from the bottom ⅓ of the bottle or container up through the center of the aeration chamber 202 and into the housing 207 where it would be connected to a pump. Once the wine has gone through the pump it can then be directed into the aeration chamber to begin the first phase of aeration. Although not readily shown, the bottom of the aeration chamber 202 can have a transecting pipe to generate the venturi effect for the second phase of aeration. Other embodiments may have a primary and a secondary aeration chamber where the primary is contained within the housing 207 and the secondary is that shown below the housing 207. In other embodiments, the return tube near the bottom of the funnel can effectively produce the venturi effect through multiple incisions in the pipe along with the pump pipe passing through the center of the return pipe. As with other configurations, the embodiment illustrated in FIG. 2 can have additional elements such as oxygen sensors, displays, and connectivity components such as Bluetooth and WIFI.

Figure 3A:
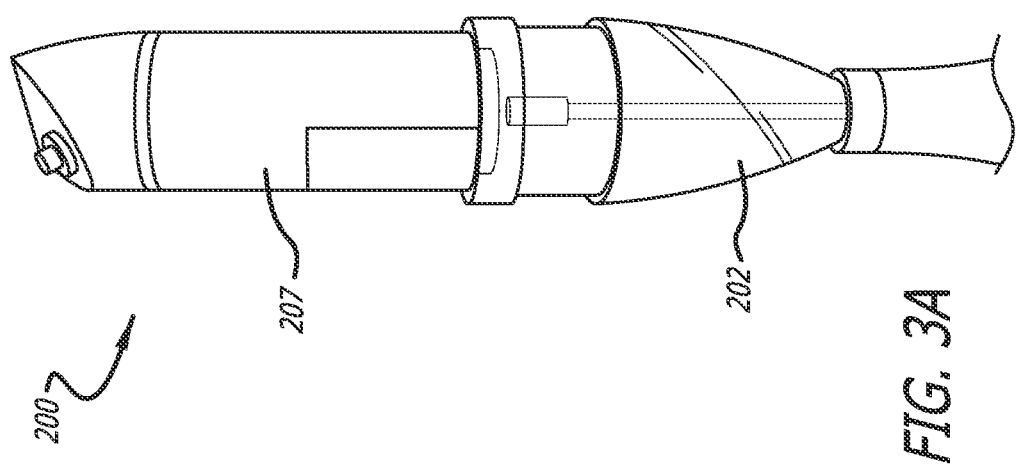
FIGS. 3A through 3C provides images a wine aeration device disposed on a wine bottle in accordance with embodiments of the invention.
Figure 3B:
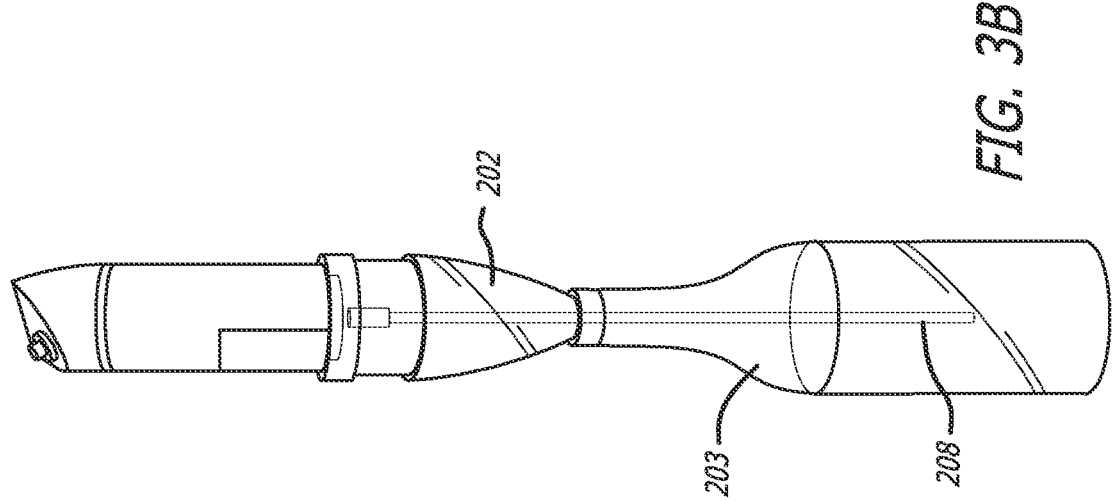
Figure 3C:
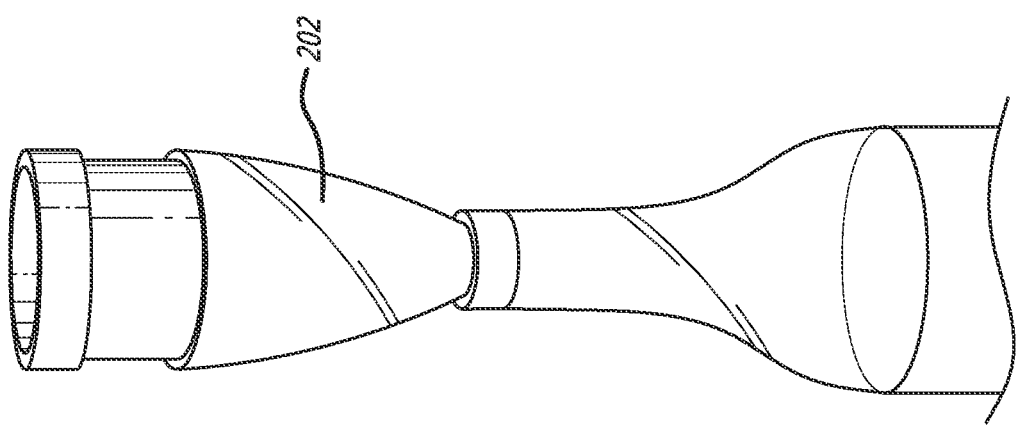

Exemplary aeration devices formed in accordance with embodiments are illustrated in the photographs provided in FIGS. 3A to 3B. Although specific shapes and forms of aeration devices and device components are illustrated, it will be understood that these may be varied in form while conserving the aeration function.

As can be seen in FIGS. 2 and 3A through 3C the aeration chamber can act as the primary aeration chamber and a secondary aeration device. For example, the centrally located pump pipe 206 can act to produce a venturi effect in the bottom portion of the aeration chamber as the wine moves through the chamber 202. Additionally, the aeration chamber 202 can secondarily act as the return tube with the bottom portion having an opening that allows the wind to flow back into the bottle from the aeration chamber 202. Although various configurations are illustrated, it should be readily understood that numerous configurations could be realized in accordance with the various embodiments of the invention.

Figure 4:
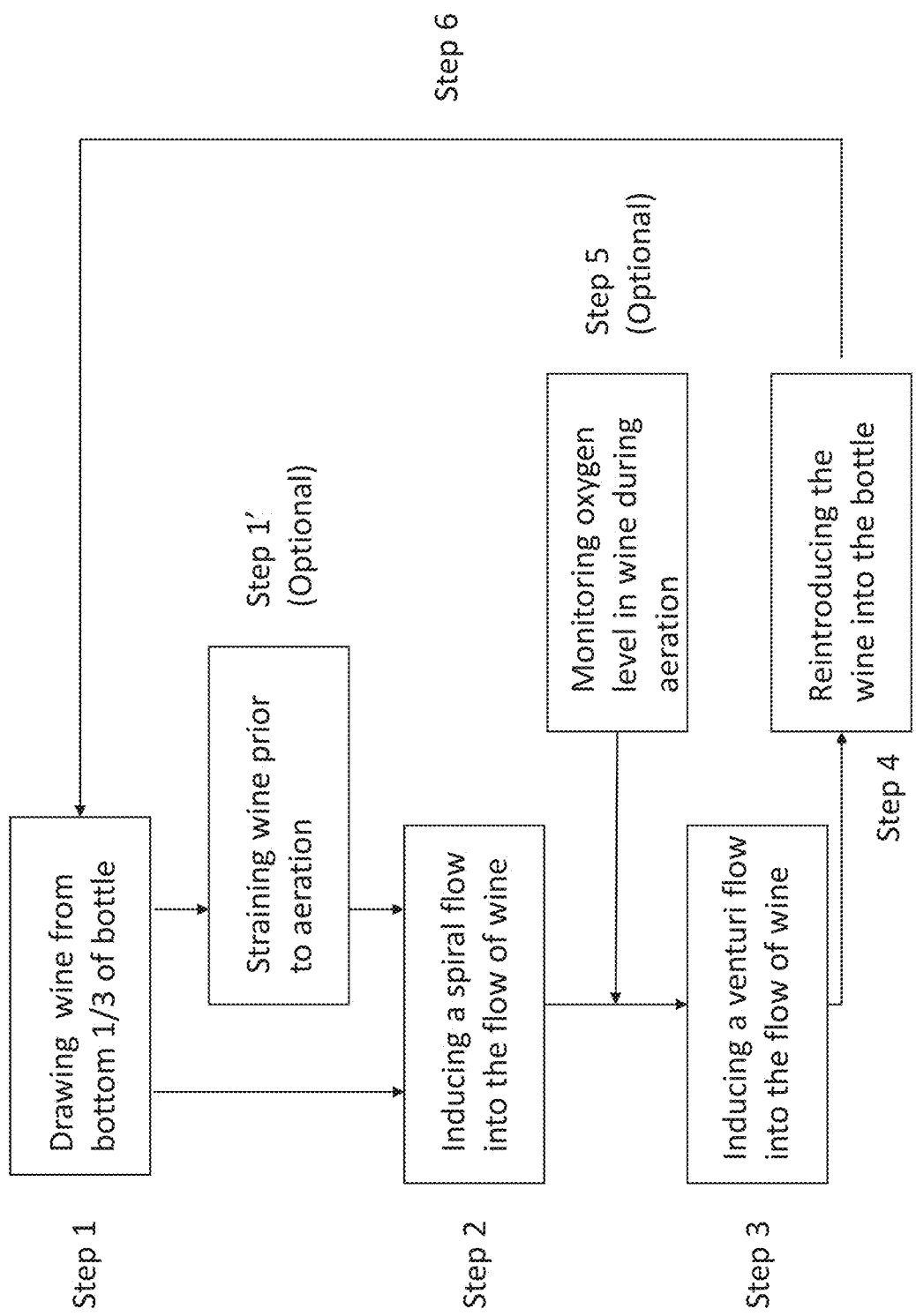
FIG. 4 provides a flow-chart of a method for aerating wine in accordance with embodiments of the invention.

Although the above discussion has focused on aeration devices, it will be understood that embodiments are also directed to methods of performing a two-phase aeration of wine using a combination of venturi effects. As shown in FIG. 4, in various embodiments the aeration methods may include drawing wine from the bottom third of a bottle (Step 1)(either with or without straining) (Step 1') into an aeration device configured to induce a spiral motion (Step 2) in the fluid thereby inducing a first phase of aeration in the wine. After the first aeration phase the partially aerated wine is directed back into the wine bottle through a return line configured to induce a venturi effect (Step 3) in the flow of the wine thus producing a second phase of aeration in the wine prior to reintroducing the wine into the bottle (Step 4). Note, although the certain steps are provided above, it will be understood that other optional steps may be introduced into the process, such as, for example, monitoring the oxygen level in the wine prior to reintroducing the wine into the bottle (Step 5), and repeating (Step 6) the aeration process as necessary to introduce a desired level of oxygenation in the wine.

DOCTRINE OF EQUIVALENTS

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A wine aeration device comprising:
a pump with an inlet valve and an exit valve connected to a power source;
a first fluid tube with an elongated body having a proximal end and a distal end where the distal end is positioned within the bottom ⅓ of a container of wine and wherein the proximal end is in fluid communication with the inlet valve of the pump;
a second fluid tube in fluid communication with the exit valve and positioned to dispense wine from the bottle into an upper portion of an aeration chamber initiating a first phase of wine aeration;
a third fluid tube in fluid communication with a bottom portion of the aeration chamber and configured to receive wine from the aeration chamber and direct the wine back into the container, and wherein the third fluid tube has at least a first set of incisions that transect the third fluid tube thereby creating a venturi effect in the wine thereby creating a second phase of wine aeration.

2. The wine aeration device of claim 1, further comprising a mesh filter on the distal end of the first fluid tube.

3. The wine aeration device of claim 1, wherein the first and third fluid tubes are metal.

4. The wine aeration device of claim 1, wherein the aeration chamber is a funnel.

5. The wine aeration device of claim 1, further comprising a power source electronically connected to the pump to activate the pump and initiate a wine aeration process.

6. The wine aeration device of claim 1, further comprising a second set of incisions transecting the third fluid tube lower than the first set of incisions.

7. The wine aeration device of claim 6, further comprising an oxygen sensor disposed in the second set of incisions and in fluid communication with the wine and configured to measure the amount of oxygen in the aerated wine.

8. The wine aeration device of claim 7, further comprising a computer processor electronically connected to the pump and the oxygen sensor such that the computer processor is programmed to activate and deactivate the pump based on the measure of oxygen provided from the oxygen sensor.

9. The wine aeration device of claim 1, further comprising a housing, wherein the housing has a body with an outer wall and an inner wall defining a space therebetween, and wherein at least the pump is disposed therein.

10. The wine aeration device of claim 9, wherein the aeration chamber is disposed within the housing.

11. The wine aeration device of claim 9, wherein the aeration chamber is disposed beneath the housing and the first fluid tube extends through the center of the aeration chamber and the third fluid tube.

12. The wine aeration device of claim 1, further comprising a metallic rod extending through the first set of incisions.

13. A wine aeration device comprising:
- a pump with an inlet valve and an exit valve connected to a power source;
- a first fluid tube with an elongated body having a proximal end and a distal end where the distal end is positioned within the bottom ⅓ of a container of wine and wherein the proximal end is in fluid communication with the inlet valve of the pump;
- a second fluid tube in fluid communication with the exit valve and positioned to dispense wine from the bottle into an upper portion of a funnel-shaped aeration chamber initiating a first phase of wine aeration;
- a third fluid tube in fluid communication with a bottom portion of the aeration chamber and configured to receive wine from the aeration chamber and direct the wine back into the container, and wherein the third fluid tube has at least a first set of incisions that transect the third fluid tube thereby creating a venturi effect in the wine thereby creating a second phase of wine aeration;
- a second set of incisions transecting the third fluid tube lower than the first set of incisions; and
- an oxygen sensor disposed in the second set of incisions and in fluid communication with the wine and configured to measure the amount of oxygen in the aerated wine.

14. The wine aeration device of claim 13, further comprising a computer processor electronically connected to the pump and the oxygen sensor such that the computer processor is programmed to activate and deactivate the pump based on the measure of oxygen provided from the oxygen sensor.

15. The wine aeration device of claim 13, further comprising a metallic rod extending through the first set of incisions.

16. The wine aeration device of claim 13, wherein the first and third fluid tubes are metal.

* * * * *